United States Patent
Wang

(10) Patent No.: US 8,428,533 B2
(45) Date of Patent: Apr. 23, 2013

(54) TECHNIQUES FOR OPTIMIZING GAIN OR NOISE FIGURE OF AN RF RECEIVER

(75) Inventor: Cheng-Han Wang, San Jose, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 304 days.

(21) Appl. No.: 12/796,598

(22) Filed: Jun. 8, 2010

(65) Prior Publication Data
US 2011/0300821 A1    Dec. 8, 2011

(51) Int. Cl.
*H04B 1/06* (2006.01)

(52) U.S. Cl.
USPC .................................. 455/232.1; 455/340

(58) Field of Classification Search ................ None
See application file for complete search history.

(56) References Cited

U.S. PATENT DOCUMENTS

| | | | |
|---|---|---|---|
| 6,324,388 B1 | 11/2001 | Souetinov | |
| 7,023,272 B2 | 4/2006 | Hung et al. | |
| 2005/0184828 A1* | 8/2005 | Son et al. | 333/174 |
| 2006/0035619 A1 | 2/2006 | Hallivuori et al. | |
| 2006/0154636 A1* | 7/2006 | Shah et al. | 455/290 |
| 2007/0032216 A1 | 2/2007 | Darabi | |
| 2007/0066256 A1 | 3/2007 | Lee | |
| 2008/0136521 A1* | 6/2008 | Chang | 330/254 |
| 2008/0220735 A1 | 9/2008 | Kim et al. | |
| 2009/0002066 A1* | 1/2009 | Lee et al. | 327/554 |
| 2009/0039964 A1 | 2/2009 | Hijikata et al. | |
| 2010/0041361 A1 | 2/2010 | Ojo | |

FOREIGN PATENT DOCUMENTS

EP    2045913    4/2009

OTHER PUBLICATIONS

International Search Report and Written Opinion—PCT/US2011/039650, International Search Authority—European Patent Office—Sep. 16, 2011.

* cited by examiner

*Primary Examiner* — Thanh Le
(74) *Attorney, Agent, or Firm* — Ramin Mobarhan

(57) ABSTRACT

Techniques for optimizing gain or noise figure of an RF receiver are disclosed. In an exemplary embodiment a controller controls a capacitor bank between an LNA and a mixer of the RF front end of the receiver. For a given center frequency a first set of capacitors is switched to the mixer and a second set of capacitors is switched to ground. The ratio of capacitance of the second set to the first set of capacitors affects either gain of the RF FE or noise figure of the receiver. Therefore, the RF FE of the receiver may be controlled in such a way as to optimize for either RF FE gain or for receiver noise figure.

15 Claims, 8 Drawing Sheets

US 8,428,533 B2

TECHNIQUES FOR OPTIMIZING GAIN OR NOISE FIGURE OF AN RF RECEIVER

TECHNICAL FIELD

The present disclosure relates to electronics and more specifically, to techniques for optimizing gain or noise figure of a receiver of a wireless communication device.

BACKGROUND

Modern wireless communication devices (WCD) are required to operate in a wide frequency range, multiple frequency bands and multiple operational modes. WCDs typically include a number of Radio Frequency (RF) receivers, RF transmitters, a baseband gain amplifier with filtering (BB) and baseband processors (BP). Each RF receiver is configured for receiving RF signals within a specified band. An RF receiver typically includes a radio frequency (RF) front end (RF FE) to down-convert the RF signal through a mixer either to Intermediate Frequency (IF) or to Zero-Intermediate-frequency (ZIF). The terms "RF receiver", "receiver" and "RF FE" are used interchangeably in this disclosure. However, one skilled in the art may appreciate that a receiver may also comprise other components, such as low pass filters or amplifiers.

An RF FE includes at least a low noise amplifier (LNA) and a mixer. RF receivers require different levels of amplification for each band and operational mode. Traditional amplification solutions employ multiple circuit blocks or modules, each with a different amplification scheme, to accommodate for the various standards. Furthermore, the use of RF output stage switches is necessary to select between the amplification schemes for each band or mode. Multi-band, multi-mode RF receivers using multiple LNAs and mixers require a large semiconductor die area and long inter-connect routings. It is a challenge to maintain low signal loss, low parasitic resistance and capacitance for such routings, since any parasitic resistance and capacitance will either introduce noise or limit the tuning range of the LNAs.

To reduce the number of LNAs, tuned multi-band, multi-mode RF FEs for RF receivers have been proposed. These proposals suggest using one LNA with a tunable LC load. The LNA may operate in current mode when a low impedance load is added to its output. FIG. 1 shows an LNA for use in a multi-band multi-mode WCD. LNA 110 includes transconductor 112, for converting the RF input voltage signal to current, inductor 114, inductor parasitic resistor 116 and capacitor 121. Inductor 114 and capacitor 121 are tunable. Thus, LNA 100 may be tuned to the desired frequency. LNA 110 is suitable for a multi-band multi-mode WCD. With this configuration, a single LNA operates over multiple frequency bands without the use of multiple LNAs. Consequently, it will not require any switches at the output of the RF FE to switch between the multiple LNAs. Tunable capacitor 121, typically, comprises a capacitor bank programmable through a plurality of switches. Typically, one switch per capacitor of the capacitor bank is used for every tunable configuration. When tuning the RF FE of a WCD that includes an LNA such as LNA 110, great care must be taken as the current transfer gain of the RF FE ("RF FE gain") and overall receiver noise figure ("receiver NF") vary as the capacitance of capacitor 121 varies.

For a given frequency and for a fixed inductance L of inductor 114, optimizing RF FE gain or receiver NF would require varying the capacitance of capacitor 121. This in turn would result in departing from the central frequency, particularly in wide-band receivers. In multi-band, multi-mode systems, it is a design challenge to optimize either for RF FE gain or for receiver NF without affecting the RF FE central frequency.

It would be advantageous to provide for a capacitor bank architecture that allows controllable optimization of RF FE gain and receiver NF in a multi-band, multi mode WCD receiver.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The present disclosure is directed to techniques for optimizing the RF FE gain or the receiver noise figure (NF) of a wireless communication device. More particularly, the present disclosure is directed to a circuit and a related operating method for optimizing the RF FE gain or the receiver NF in a receiver with a passive mixer and low BB input impedance load.

A receiver for a wideband WCD is disclosed. The receiver has a tunable RF FE, where the RF FE includes a programmable capacitor bank. The disclosed programmable capacitor bank architecture allows for optimization of the RF FE gain or the receiver NF. The capacitor bank allows optimization of the RF FE gain or of the receiver NF while maintaining the total capacitance appearing at the load of the LNA of the RF FE substantially constant. As a result, the optimization of the RF FE gain or the receiver NF does not affect the central frequency of the RF FE.

Figure 1:
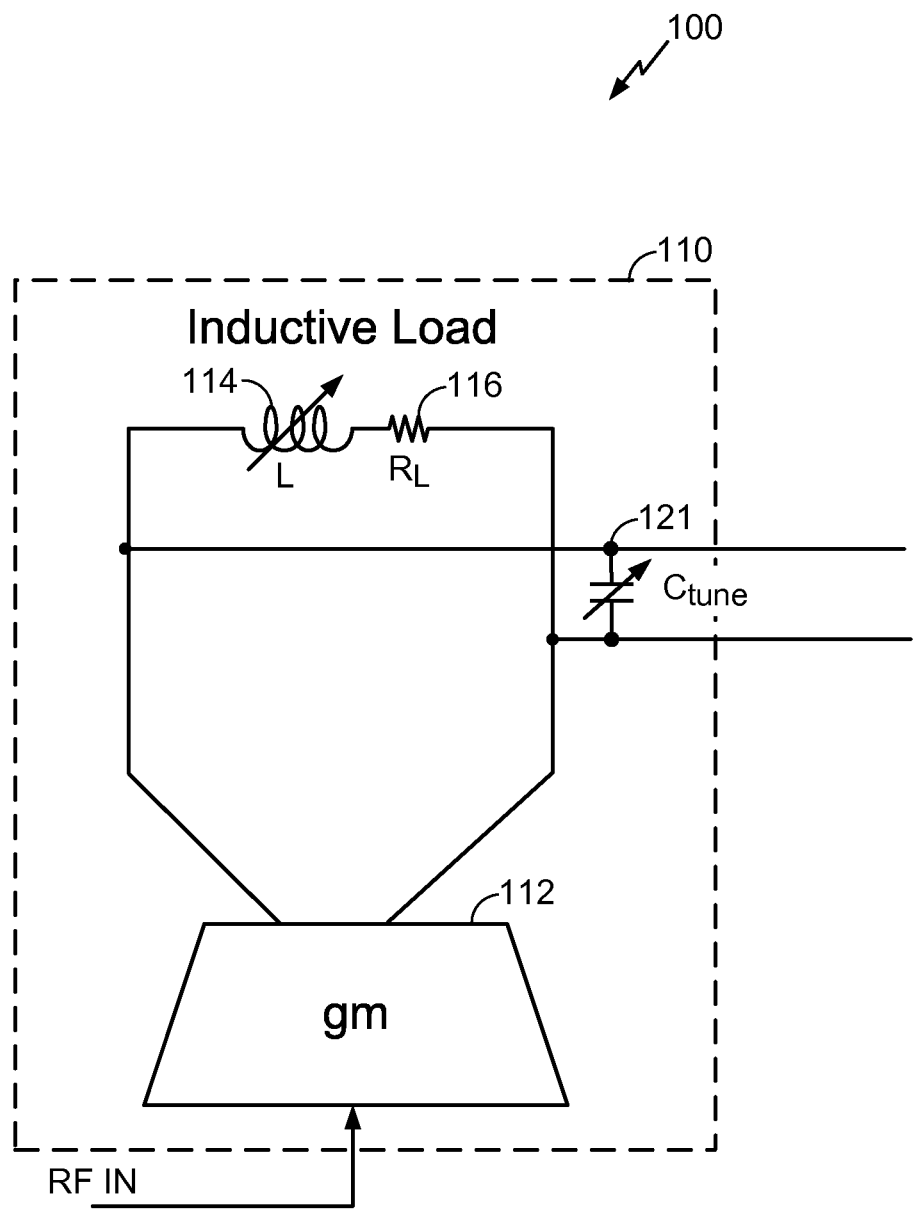
FIG. 1 shows an LNA for use in a multi-band multi-mode WCD.
Figure 2:
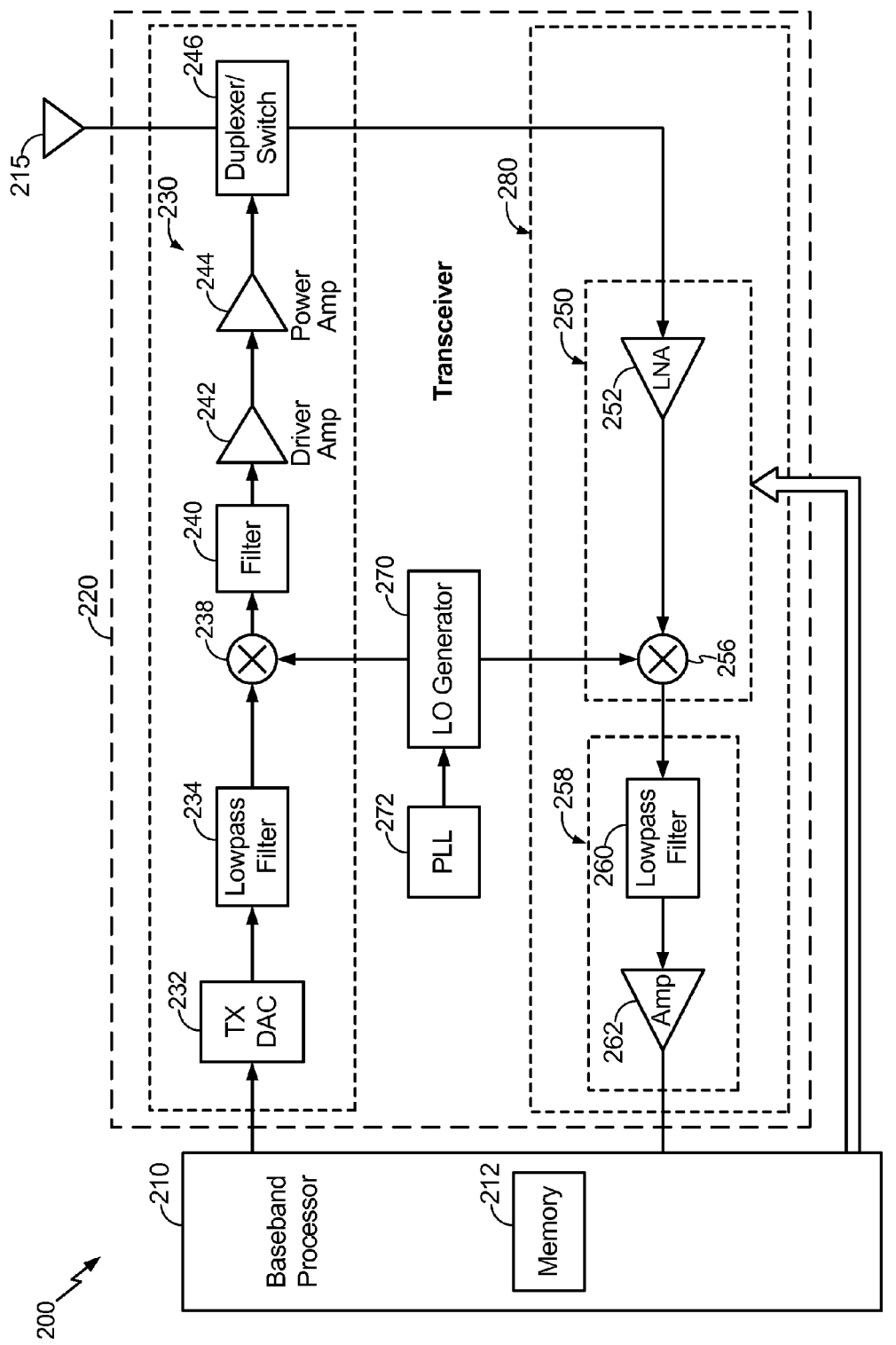
FIG. 2 shows a system level block diagram of a wireless communication device.

FIG. 2 shows a system level block diagram of a wireless communication device. WCD 200 comprises transceiver 220 and Baseband Processor (BP) 210. Transceiver 220 includes transmitter 230 and receiver 280. Receiver 280 includes RF FE 250 and BB 258. RF FE 250 includes at least LNA 252 and mixer 256. BP 210 controls various functions of transceiver 220. Accordingly, BP 210 may control RF FE 250. Controlling RF FE 250 may include tuning one or more of frequency, gain or NF of LNA 252. Tuning LNA 252 may include controlling a capacitor bank configuration. The proposed solution deals with the aspect of controlling a capacitor bank configuration for the purpose of optimizing RF FE gain or receiver NF in multi-band multi-mode WCDs. The concept of controlling desired optimized state (either optimizing RF FE gain or receiver NF) in a multi-band multi-mode WCD will be described with reference to the block diagram of FIG. 3A.

Figure 3A:
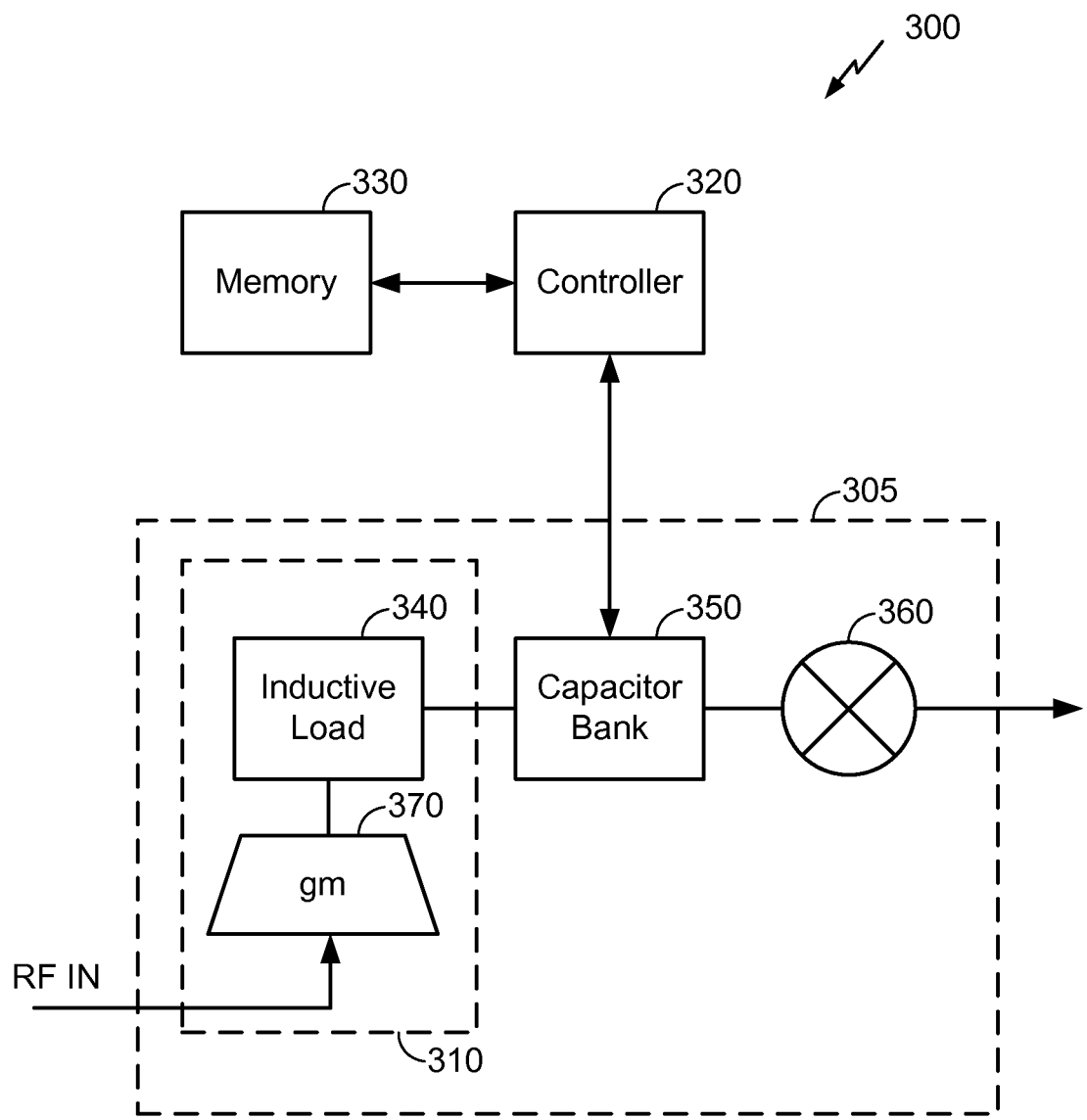
FIG. 3A is a block diagram of a device according to an exemplary embodiment.

FIG. 3A is a block diagram of a device according to an exemplary embodiment. Device 300 may be implemented as one integrated circuit, or as various ICs of a WCD. Device 300 includes RF FE 305, controller 320 and memory 330. RF FE 305 includes LNA 310, capacitor bank 350 and mixer 360. LNA 310 includes transconductor (gm) 370 and inductive load 340. Capacitor bank 350 is coupled at one end to the LNA 310 and at the other end to mixer 360. Controller 320 selects values from memory 330 in response to a desired center frequency for tuning the RF FE and in response to a desired optimized state of operation (either RF FE gain or receiver NF). Controller 320 controls capacitor bank 350. Although capacitor 320 and memory 330 are shown outside RF FE 305 in FIG. 3 one skilled in the art may appreciate that either controller 320 or memory 330 or both can also reside inside RF FE 305. Capacitor bank 350 may be controlled in a way that portion of its capacitance is part of the LC load of the LNA and portion of its capacitance is used for ac coupling the output of the LNA to the input of the mixer. Capacitor bank 350 may include switches for selecting a total capacitance, out of a total available capacitance, required for tuning LNA 310 to a desired center frequency. The total available capacitance is the total capacitance a capacitor bank can achieve if all capacitors are switched to ground or to mixer 360. The total capacitance is the sum of a first capacitance and a second capacitance. The first capacitance (Ctune) is the capacitance of a first set of capacitors from capacitor bank 350 switched between inductive load 340 and ground. The first set of capacitors acts as the capacitive load of the LC load of LNA 310. The second capacitance (Cmixer) is the capacitance of a second set of capacitors from capacitor bank 350 switched between inductive load 340 and mixer 360. The second set of capacitors is part of the input impedance of the mixer. The desired center frequency stays substantially constant when we keep the total capacitance $C_T$=Ctune+Cmixer constant and only redistribute the capacitors switched to ground and the capacitors switched to mixer 360 to achieve a different capacitance ratio Ctune/Cmixer. Now, let Imixer be the current running through mixer 360 and $I_{LNA}$ the current running through LNA 310. Then, Imixer/$I_{LNA}$ is the RF FE gain. By redistributing the capacitance ratio Ctune/Cmixer it is possible to optimize the value of the RF FE gain. Furthermore, it is also possible to optimize the receiver NF.

Figure 3B:
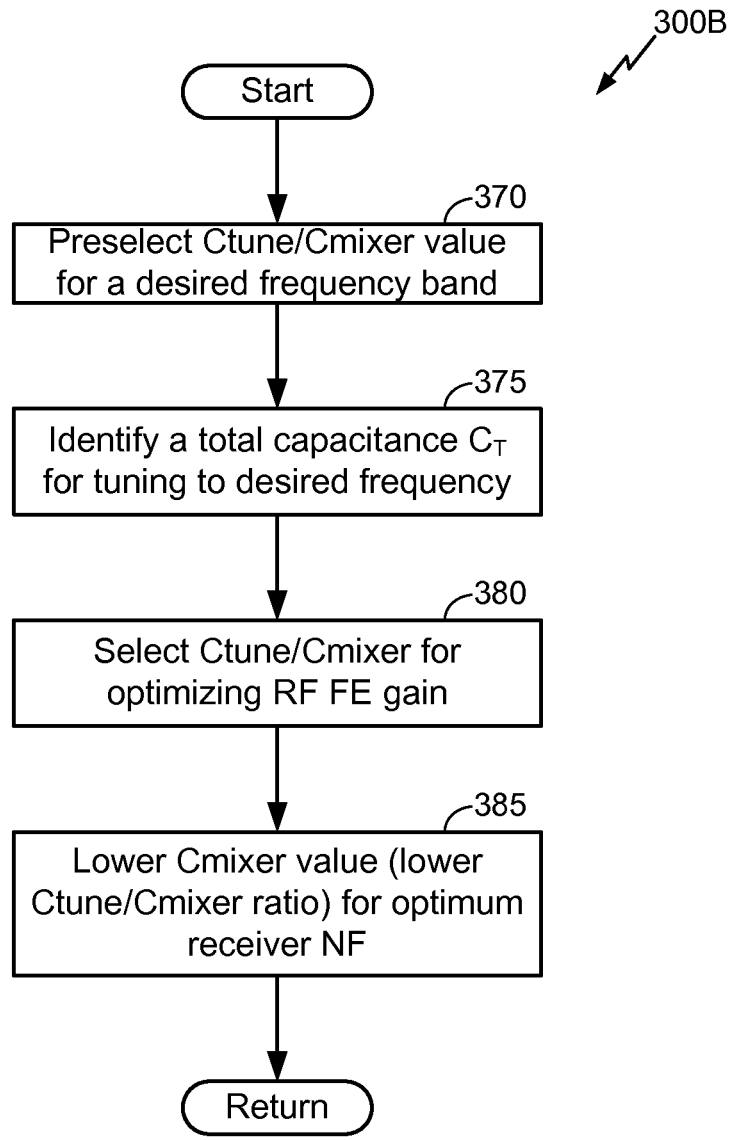
FIG. 3B is a flow diagram of a calibration process for the device of FIG. 3A.

The process of calibrating the device of FIG. 3A will be described with reference to FIG. 3B. FIG. 3B is a flow diagram of a calibration process for the device of FIG. 3A. In a first step 370, a Ctune/Cmixer ratio value is preselected based on calculations. Then, in step 375, a total capacitance $C_T$ is identified to tune to a selected frequency. Then, in step 380, a ratio of Ctune/Cmixer is identified for achieving optimum RF FE gain. Finally, in step 385, the Cmixer value is lowered, resulting in a slightly higher ratio than that for the optimum RF FE gain, to optimize for receiver NF. It should be noted that it is not always accurate to use the preselected, based on calculations, values of Cmixer and Ctune for optimizing for RF FE gain or for receiver NF as their actual values might vary from their theoretical ones due to process variation. It is always necessary, therefore, to calibrate the device during testing.

Figure 4:
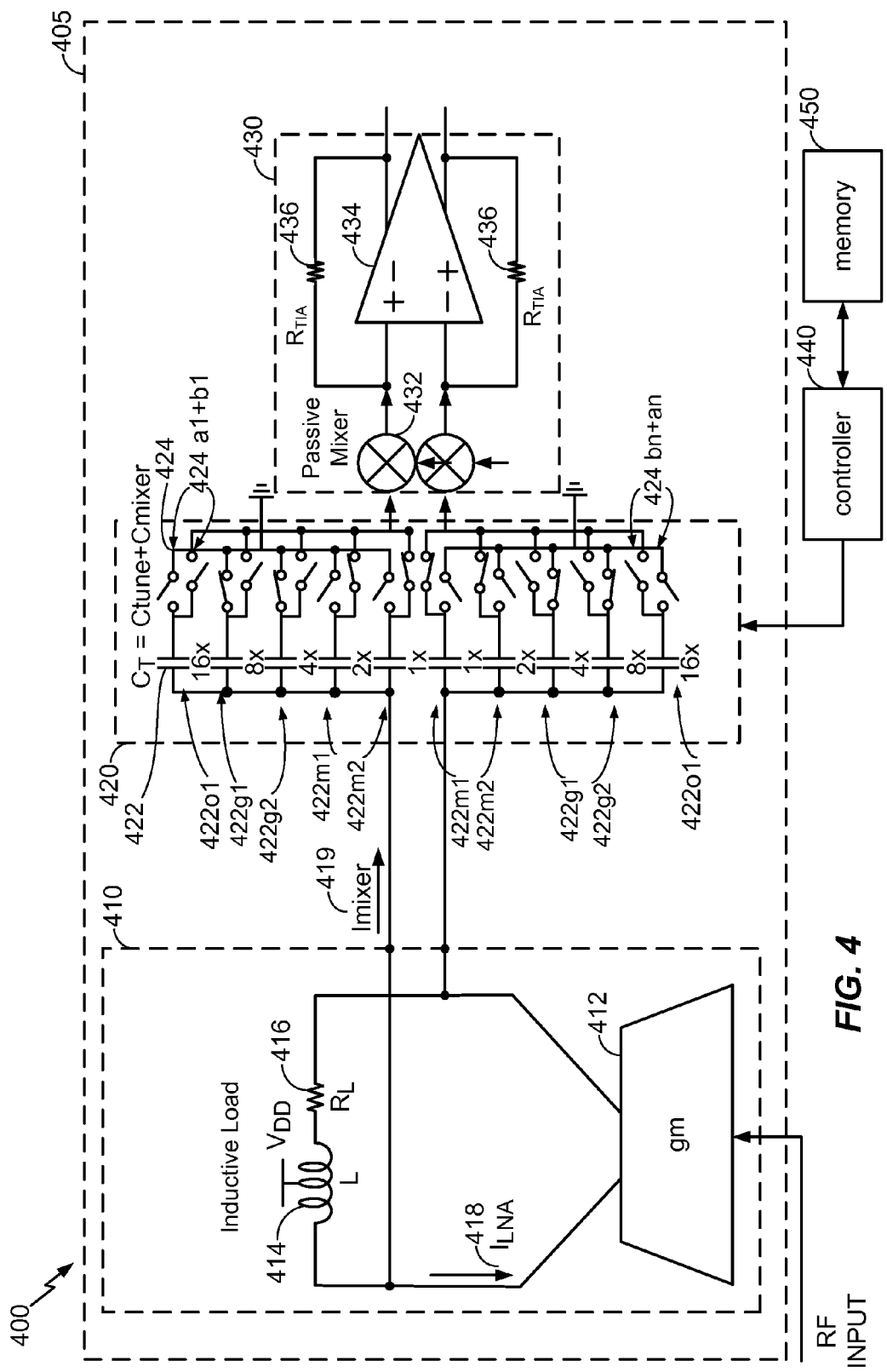
FIG. 4 is an exemplary implementation of the RF FE of FIG. 3.

FIG. 4 is an exemplary implementation of the RF FE of FIG. 3. In this example, RF FE 400 is a differential RF FE. One skilled in the art can appreciate that a single ended implementation is also foreseen by the present disclosure. FE 400 comprises LNA 410, capacitor bank 420 and downconverter 430. LNA 410 includes transconductor 412, inductor 414 and resistor 416. Downconverter 430 includes mixer 432 and transimpedance amplifier (TIA) 434. Resistors 436 act as feedback resistors to TIA 434. Mixer 432 may be a passive mixer. Transconductor 412 amplifies the RF signal at the input of the LNA as it converts the RF input voltage into current ($I_{LNA}$). Although inductor L is shown as a fixed inductor, one skilled in the art can appreciate that tunable or switchable inductors may also be used as part of the inductive load.

Capacitor bank 420 is coupled at one side to the inductive load of LNA 410. Capacitor bank 420 includes a set of capacitors 422(1 ... n) and a set of switches 424(1 ... n)a+b. Each capacitor 422 is coupled to two switches (424a, 424b). Although capacitor bank 420 is depicted binary weighted to allow for wide band applications, one skilled in the art may appreciate that other capacitor bank configurations are possible without departing from the scope of the invention. Now, each capacitor in the capacitor bank can only be at one of the following states at any given time: a) have both switches open (424a open and 424b open) b) have one switch open and one closed to ground (e.g. 424a open and 424b closed) c) have one switch open and one closed to mixer 432 (e.g. 424a closed and 424b open). This can be achieved with three-state logic, such as a tri-state buffer. One skilled in the art may appreciate that other solutions for implementing the three-state logic of the capacitor bank discussed in this disclosure may be possible without departing from the scope of the invention.

Now, a first set of capacitors (422$_{g1}$ and 422$_{g2}$ in the example of FIG. 4) is defined by the capacitors that are switched to ground. The capacitance of the first set of capacitors is the sum of capacitances of each capacitor 422 switched to ground. This capacitance is equivalent to the capacitance Ctune discussed earlier with reference to FIG. 3. A second set of capacitors (422$_{m1}$ and 422$_{m2}$ in the example of FIG. 4) is defined by the capacitors that are switched to the mixer. The capacitance of the second set of capacitors is the sum of capacitances of each capacitor 422 switched to the mixer.

This capacitance is equivalent to the capacitance Cmixer discussed earlier with reference to FIG. 3. A third set of capacitors ($422_{o1}$ in the example of FIG. 4) is defined by the capacitors that have both switches open.

TIA 434 converts current at the output of mixer 432 to voltage. Mixer 432 is coupled to LNA 410 through the second set of capacitors of capacitor bank 420 as mentioned above. The input impedance ($Z_{TIA}$) of a TIA can be expressed as:

$$Z_{TIA} = \frac{R_{TIA}}{1 - G_{loopgain}}$$

Where $R_{TIA}$ is the feedback resistor of the TIA and $G_{loopgain}$ is the loop gain of the TIA. With a proper design of $G_{loopgain}$ a low input impedance of the TIA is achieved which is a prerequisite for the proposed implementation.

For the RF FE 400, a total capacitance $C_T$ is defined by the sum Ctune+Cmixer. For each center frequency there is one optimum total capacitance required to tune the LNA to the desired center frequency. The RF FE gain associated to a selected total capacitance is a factor of the ratio Ctune/Cmixer. Therefore, for each center frequency a specific combination of Ctune and Cmixer is suitable to optimize for RF FE gain. Receiver noise figure, on the other hand, depends on BB noise and mixer noise conditions. Furthermore, receiver NF is affected by the output impedance of the LNA and the impedance of the mixer. Cmixer affects the output impedance of the LNA and the impedance of the mixer. As a result, Cmixer affects the receiver NF. It is, therefore, possible to optimize for receiver NF by changing the ratio Ctune/Cmixer.

Figure 5:
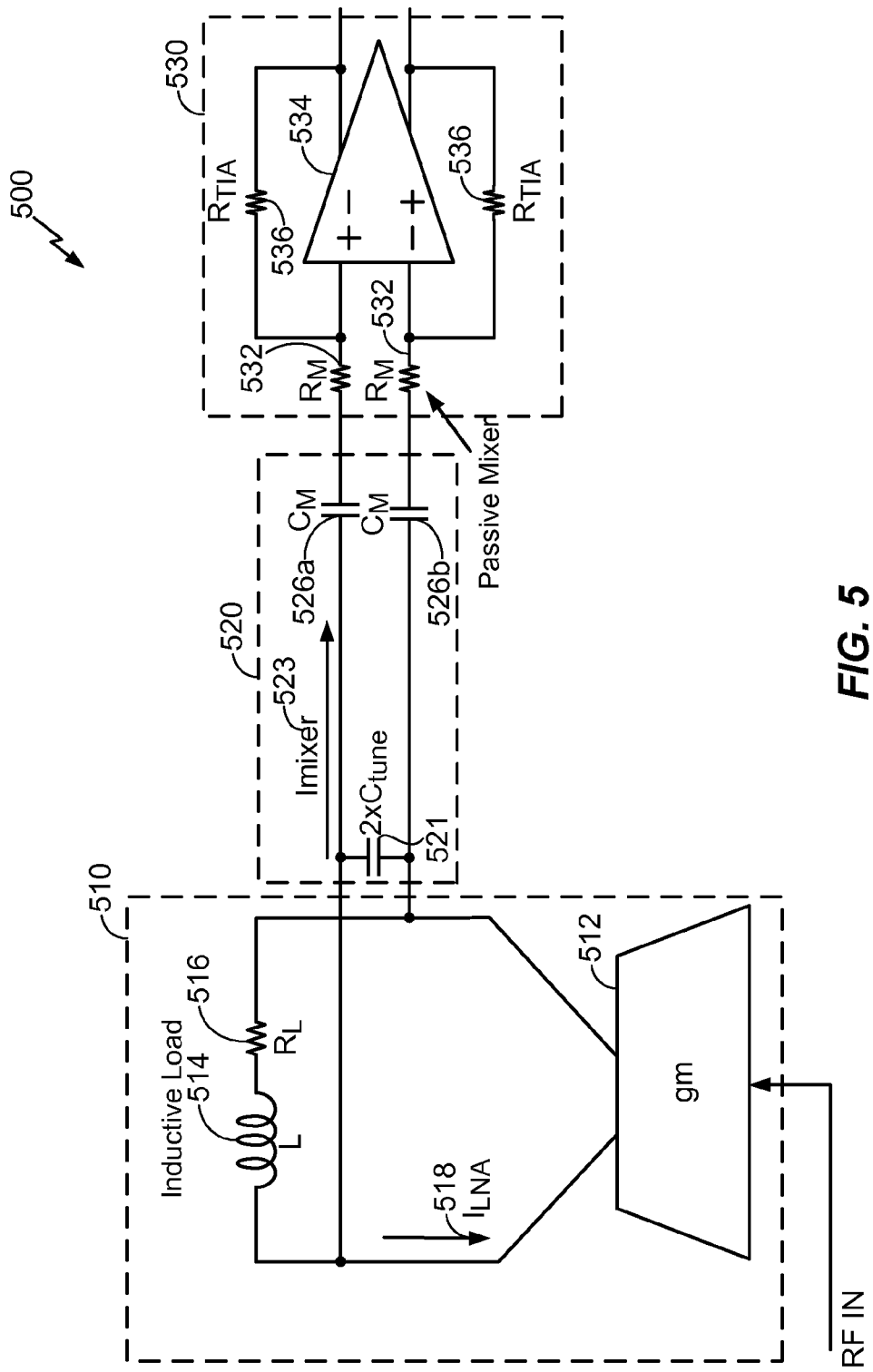
FIG. 5 is an equivalent configuration for the RF FE of FIG. 4.

Analysis of the concept of modifying the ratio Ctune/Cmixer to optimize for RF FE gain will be performed with reference to FIG. 5. FIG. 5 is an equivalent configuration for the RF FE of FIG. 4. RF FE 500 comprises LNA 510, capacitor configuration 520 and downconverter 530. LNA 510 is similar to LNA 410 of FIG. 4. Capacitor configuration 520 is equivalent to capacitor bank 420 of FIG. 4 for a particular center frequency. Capacitor configuration comprises capacitor 523 (2 times Ctune) and capacitors Cmixer 526a and Cmixer 526b. Downconverter 530 is equivalent to downconverter 430 of FIG. 4. Mixer 432 of FIG. 4 is replaced by resistors $R_M$ 532.

For the current transfer gain function the following equations apply:

$$\frac{I_{mixer}}{I_{LNA}} = \frac{\left(Z_L \| \frac{1}{j\omega C_{tune}}\right)\|Z_M}{Z_M}$$

$$= \frac{\frac{j\omega L + R_L}{(1 - \omega^2 LC_{tune}) + j\omega R_L C_{tune}}}{\frac{j\omega L + R_L}{(1 - \omega^2 LC_{tune}) + j\omega R_L C_{tune}} + \frac{1}{j\omega C_M} + R_M}$$

$$= \frac{j\omega L + R_L}{j\omega L + R_L + \left(\frac{1}{j\omega C_M} + R_M\right)[(1 - \omega^2 LC_{tune}) + j\omega R_L C_{tune}]}$$

$$= \frac{-\omega^2 LC + j\omega C_M R_L}{(1 - \omega^2 LC_{tune} - \omega^2 LC_M - \omega^2 R_M R_L C_M C_{tune}) +}$$
$$j\omega CR_L \left(1 + \frac{C_{tune}}{C_M}\right) + j\omega C_M R_M (1 - \omega^2 LC_{tune})$$

Where: $Z_L$ is impedance of the inductive load and $\omega$ is the angular frequency. We can assume that the real part in denominator is nullified at the resonant frequency $\omega_0$. Therefore for optimizing RF FE gain the following equation stands:

$$(1 - \omega_0^2 LC_{tune} - \omega_0^2 LC_M - \omega_0^2 R_M R_L C_M C_{tune}) = 0$$

at the resonant frequency $\omega_0$. Therefore:

$$\frac{I_{mixer}}{I_{LNA}} \approx \frac{j\omega_0 L + R_L}{R_L\left(1 + \frac{C_{tune}}{C_M}\right) + R_M(1 - \omega_0^2 LC_{tune})}$$

$$= \frac{j\omega_0 L + R_L}{R_L\left(1 + \frac{C_{tune}}{C_M}\right) + R_M(\omega_0^2 LC_M + \omega_0^2 R_M R_L C_M C_{tune})}$$

That means that for a given LNA inductive load, given mixer resistances and given TIA input impedance, the RF FE gain is a function of Ctune and Cmixer. Therefore, there is a unique combination of Ctune and Cmixer for tuning an LNA to a desired center frequency and for achieving optimum RF FE gain.

Now, the total noise figure of the receiver may be modeled by the Friis formula as follows:

$$NF_{total} = 10\log\left(F_{FE} + \frac{F_{BB} - 1}{G_{FE}}\right)$$

where $F_{FE}$ is the noise factor of the RF FE, $F_{BB}$ is the noise factor of the BB and $G_{FE}$ is the RF FE gain.

Figure 6:
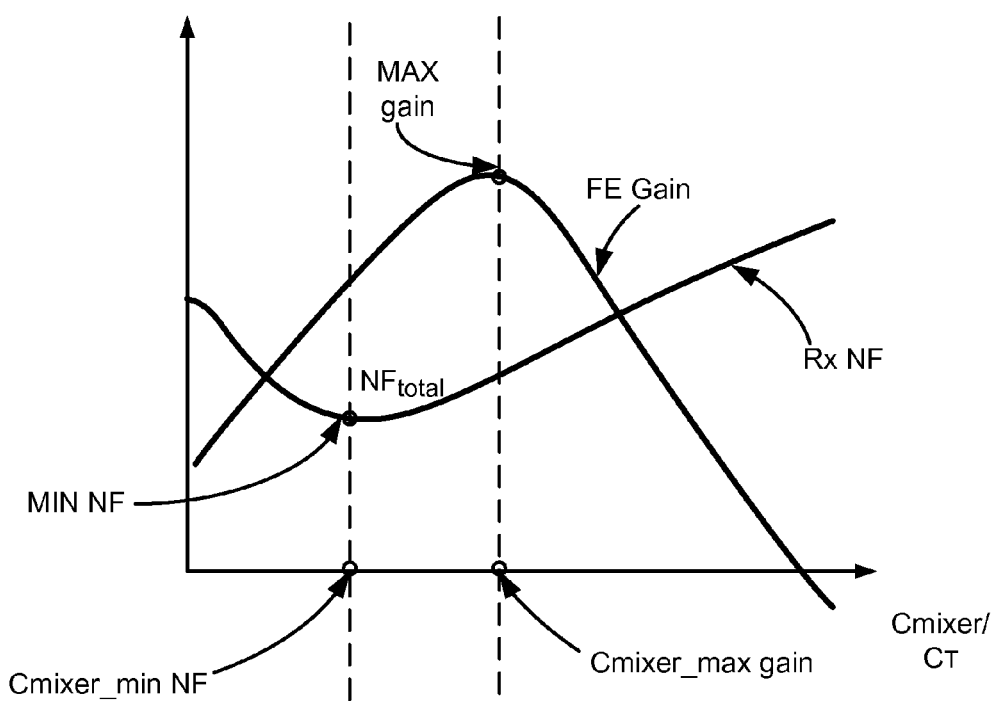
FIG. 6 is a chart illustrating the variance of $G_{FE}$ and $NF_{total}$ as a factor of $Cmixer/C_T$

According to the equation, if the RF FE gain is sufficiently high, the overall noise figure, $NF_{total}$ will be dominated by the noise figure of the RF FE, $F_{FE}$. The implications of this equation will be discussed with reference to FIG. 6. FIG. 6 is a chart illustrating the variance of $G_{FE}$ and $NF_{total}$ as a factor of Cmixer/$C_T$. As it can be seen, as Cmixer/$C_T$ decreases, $G_{FE}$ reaches a maximum value which is the optimum RF FE gain discussed earlier. For a range of Cmixer/$C_T$ values, $G_{FE}$ increases (as Cmixer/$C_T$ decreases) and $NF_{total}$ decreases. However, $NF_{total}$ will continue to decrease further, as Cmixer/$C_T$ decreases further beyond the point where $G_{FE}$ reaches its maximum value. $NF_{total}$ reaches a local minimum at a Cmixer/$C_T$ value lower than the Cmixer/$C_T$ value corresponding to maximum $G_{FE}$.

As illustrated, there is a different value of Cmixer/$C_T$ for optimizing for RF FE gain and a different value of Cmixer/$C_T$ for optimizing for receiver NF.

The calculated values for the best ratio of capacitance for optimizing RF FE gain for each resonant frequency in a multi band, multi mode WCD, maybe stored in a memory, such as memory 330 of FIG. 3. The memory includes at least a first set of values of Ctune and Cmixer for the optimum RF FE gain. A second set of values Ctune and Cmixer is stored in memory 330 respectively, for optimum receiver NF. A controller, such as controller 320, may be programmed to select different values of Ctune and Cmixer from memory based on a desired optimized state. These values allow a controller 320, 440 for a given center frequency, to switch capacitor bank 350, 420 appropriately to optimize for an operational state, either RF FE gain or receiver NF. There are cases where optimum RF FE gain is preferable over an optimum receiver NF and vice versa. In cases where a balance state between an optimum RF FE gain and receiver NF is required, controller 320 has the option to select, from memory 330, a third set of values for Ctune and Cmixer, where the ratio of capacitance is in between the ratio for optimum RF FE gain and the ratio for optimum receiver NF.

Figure 7:
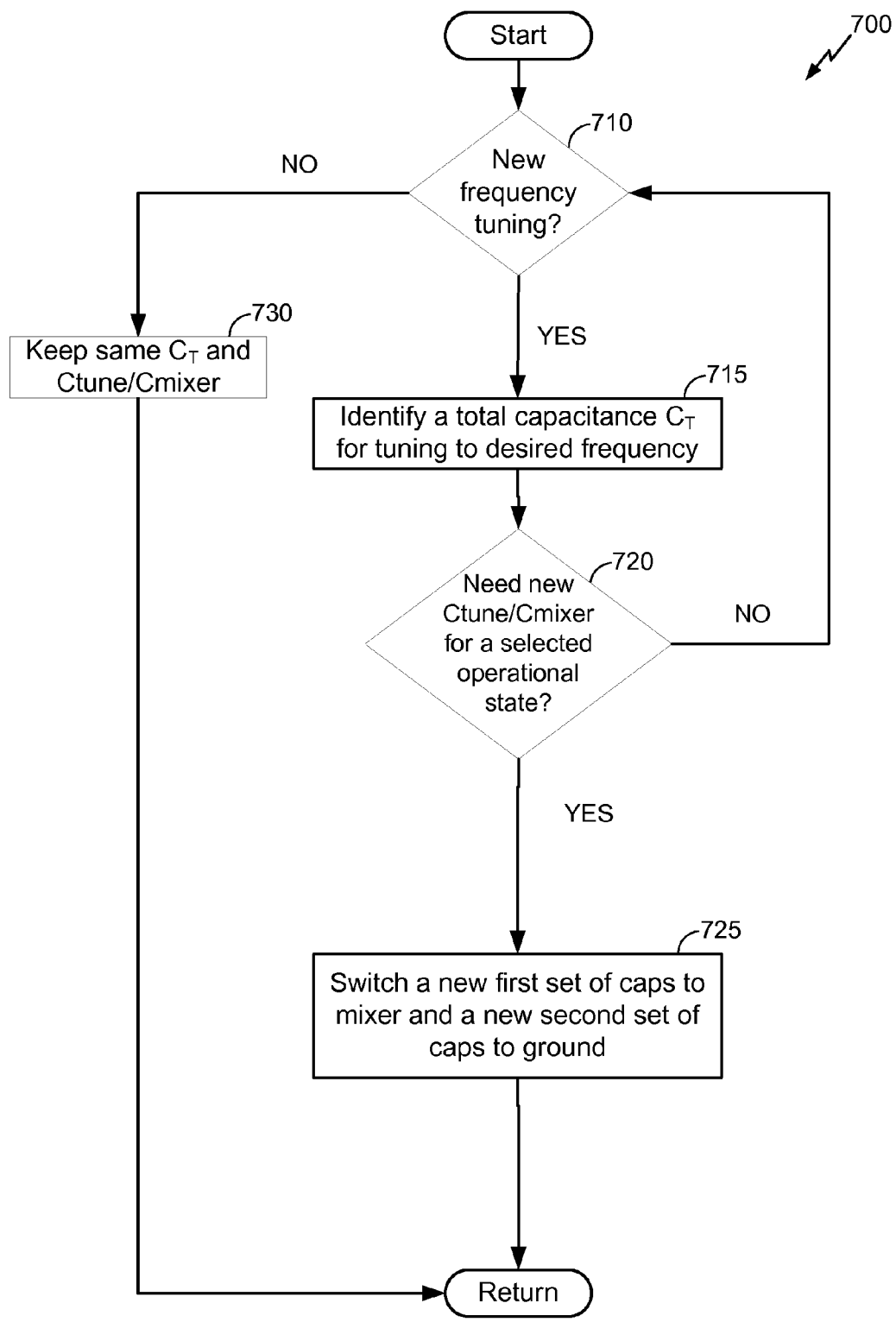
FIG. 7 is a flow diagram for a method of optimizing RF FE gain or receiver NF of a multi-band multi-mode WCD

The detailed method performed by controller 320 will be explained with reference to FIG. 7. FIG. 7 is a flow diagram for a method of optimizing RF FE gain or receiver NF of a multi-band multi-mode WCD. In decision step 710, a requirement for new frequency tuning is identified. In case there is such a requirement then, in step 715, a new total capacitance $C_T$ is defined. Then, in decision step 720, a requirement for a new capacitance ratio Ctune/Cmixer is identified, based on a desired optimized state of operation (RF FE gain or receiver NF). Then, in step 725, a new first set of capacitors is switched to ground and a new second set of capacitors is switched to the mixer in response to the new Ctune/Cmixer ratio. In case there is no need for frequency tuning then $C_T$ and Ctune/Cmixer ratio remain the same, in step 730, until a requirement for frequency tuning is identified. Similarly, if in decision step 720 there is no requirement for new Ctune/Cmixer ratio, the capacitance ratio remains the same until a new requirement is present.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A receiver operable over a range of desired frequencies, comprising:
   a programmable capacitor bank including a first set of capacitors coupled to the output of a low noise amplifier (LNA), and a second set of capacitors coupled to the input of a mixer; and
   a controller to generate capacitor switch signals to set the first and second sets of capacitors to capacitance values defined by a noise figure optimized ratio of tuning capacitance to mixer capacitance,
   wherein the noise figure optimized ratio of tuning capacitance to mixer capacitance is determined a priori by identifying a desired total capacitance for each desired frequency, calculating an optimum gain ratio of tuning capacitance to mixer capacitance based on the total capacitance, and adjusting the optimum ratio to the noise figure optimized ratio.

2. The receiver of claim 1, wherein the first set of capacitors is coupled between the LNA and ground and the second set of capacitors is coupled between the LNA and the mixer.

3. The receiver of claim 1, wherein the mixer is a passive mixer.

4. A receiver comprising:
   a first set of capacitors associated with a tuning capacitance and coupled to the output of an LNA;

a second set of capacitors associated with a mixer capacitance and coupled to the input of a mixer; and a set of switches to programmably set the tuning capacitance and the mixer capacitance to a noise figure optimized ratio during frequency tuning, wherein the noise figure optimized ratio is set by a controller using values established a priori by a process involving calculating an optimum gain ratio of tuning capacitance to mixer capacitance for each frequency over a range of desired frequencies, and then, for each such frequency, lowering the optimum gain ratio until a noise figure optimized ratio is identified.

5. The receiver of claim 4, wherein the first set of capacitors is coupled between the LNA and ground and the second set of capacitors is coupled between the LNA and the mixer.

6. The receiver of claim 4, wherein the mixer is a passive mixer.

7. A method of controlling a receiver including an LNA, a mixer, and a programmable capacitor bank, the programmable capacitor bank including a first set of capacitors, a second set of capacitors, and a plurality of switches, and operable over a range of desired frequencies, the method comprising:

receiving switch control signals that are programmably selected by a controller during frequency tuning; and configuring the programmable capacitor bank, in response to the switch control signals, to set a tuning capacitance and a mixer capacitance to a noise figure optimized ratio, wherein the noise figure optimized ratio is established a priori by a process involving calculating an optimum gain ratio of tuning capacitance to mixer capacitance for each frequency over a range of desired frequencies, and then, for each such frequency, lowering the optimum gain ratio until a noise figure optimized ratio is identified.

8. An intergrated circuit including a receiver, comprising:

a first set of capacitors associated with a tuning capacitance and coupled to the output of an LNA;

a second set of capacitors associated with a mixer capacitance and coupled to the input of a mixer; and a set of switches to programmably set the tuning capacitance and the mixer capacitance to a noise figure optimized ratio during frequency tuning, wherein the noise figure optimized ratio is set by a controller using values established a priori by a process involving calculating an optimum gain ratio of tuning capacitance to mixer capacitance for each frequency over a range of desired frequencies, and then, for each such frequency, lowering the optimum gain ratio until a noise figure optimized ratio is identified.

9. The IC of claim 8, wherein the first set of capacitors is coupled between the LNA and ground and the second set of capacitors is coupled between the LNA and the mixer.

10. The IC of claim 8, where the mixer is a passive mixer.

11. A device including a controller for configuring a receiver including an LNA, a mixer and a programmable capacitor bank to operate over a range of desired frequencies, comprising:

means for retrieving values from a memory in response to a detection of a change in desired frequency of receiver operation; and means for generating switch control signals in response to the retrieved values to programmably set a tuning capacitance and a mixer capacitance of the programmable capacitor bank to a noise figure optimized ratio, wherein the noise figure optimized ratio is established a priori by a process involving calculating an optimum gain ratio of tuning capacitance to mixer capacitance for each frequency over a range of desired frequencies, and then, for each such frequency, lowering the optimum gain ratio until a noise figure optimized ratio is identified.

12. The device of claim 11, wherein the means for generating switch control signals includes means for switching a first set of capacitors in the programmable bank of capacitors between the LNA and ground and a second set of capacitors between the LNA and the mixer.

13. A wireless communication comprising:

a controller;

a memory; and a receiver having:

a first set of capacitors associated with a tuning capacitance and coupled to the output of an LNA;

a second set of capacitors associated with a mixer capacitance and coupled to the input of a mixer; and a set of switches to programmably set the tuning capacitance and the mixer capacitance to a noise figure optimized ratio during frequency tuning, wherein the noise figure optimized ratio is set by the controller using values retrieved from the memory, the values being established a priori by a process involving calculating an optimum gain ratio of tuning capacitance to mixer capacitance for each frequency over a range of desired frequencies, and then, for each such frequency, lowering the optimum gain ratio until a noise figure optimized ratio is identified.

14. The wireless communication device of claim 13, wherein the first set of capacitors is coupled between the LNA and ground and the second set of capacitors is coupled between the LNA and the mixer.

15. The wireless communication device of claim 13, where the mixer is a passive mixer.

* * * * *